United States Patent Office 2,764,616
Patented Sept. 25, 1956

2,764,616

ALKYL AND ARALKYL ETHERS OF 4a-METHYL-6-HYDROXY-1,2,3,4,4a,9,10,10a-OCTAHYDRO-1-PHENANTHRONES

Willard M. Hoehn, Wilmette, and Roy H. Bible, Jr., Chicago, Ill., assignors, by mesne assignments, to G. D. Searle & Co., Skokie, Ill., a corporation of Delaware No Drawing. Application April 29, 1952,
Serial No. 285,054

5 Claims. (Cl. 260—590)

The present invention relates to a new group of polycyclic ketones and more particularly to the ethers of 4a-methyl-6-hydroxy-1,2,3,4,4a,9,10,10a-octahydro-1-phenanthrones. These compounds can be represented by the structural formula

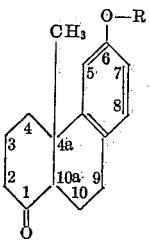

wherein R is either a lower alkyl or an aralkyl radical. Among the radicals which R can represent are methyl, ethyl, straight and branched chain propyl, butyl, amyl, and hexyl, as well as benzyl and phenethyl.

These ethers are conveniently prepared by the following procedure. An O-alkyl or O-aralkyl podocarpinol is dehydrated by a convention procedure, such as that employed by Campbell and Todd, J. Amer. Chem. Soc., 64, 933 (1942).

The mixture of the dehydration products is distilled but no further purification is attempted at that stage. The resulting oil is then dissolved in an inert organic solvent which is not attacked by ozone and treated with a mixture of ozone and air under cooling to control the reaction. The resulting ozonide is then decomposed to form the desired ketone; this decomposition is suitably accomplished by heating with water. After removal of acidic products with alkali the ketonic fraction is isolated conveniently from the reaction mixture by use of a Girard reagent such as N-hydrazidoacetopyridinium chloride, known as Girard's reagent "P," which forms a derivative of the type

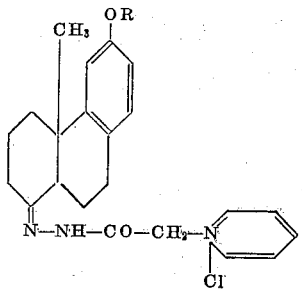

The free ketone is regained by acidic hydrolysis. Further purification can be achieved by chromatography.

The claimed ethers are valuable hormonal agents especially because of their estrogenic activity. Further, these ethers are valuable as intermediates in organic synthesis. Thus dealkylation of the ether yields the free phenol, which boils at about 142–148° C. at 0.1 mm. pressure. The methylene group at carbon-9 can be converted to a 9-oxo group and 7-substitution can be achieved by introducing a nitro group. Important intermediates in the synthesis of steroid-like compounds, which can be prepared from these 1-phenanthrones, are the 2-benzal-4a-methyl-6-alkoxy-1-phenanthrones, which can be reduced to the 2-benzal-4a-methyl-6-alkoxy-1-phenanthrols.

Our invention will appear more fully in conjunction with the following examples. It should be understood, however, that these are given by way of illustration only and that the invention is not to be construed as limited thereby in spirit or in scope. It will be apparent to those skilled in the art that many modifications in materials and methods may be made without departing from the invention. In each of these examples temperatures are given uncorrected in degrees centigrade (° C.), pressures in millimeters (mm.) of mercury, and quantities of materials in parts by weight.

EXAMPLE 1

*4a-methyl-6-methoxy-1,2,3,4,4a,9,10,10a-octahydro-1-phenanthrone*

A mixture of ozone and oxygen is bubbled into a solution of 20 parts of dehydrated O-methylpodocarpinol in a mixture of 64 parts of carbon tetrachloride and 60 parts of chloroform, while the solution is maintained at −60° C. After the theoretical amount of ozone is passed into the mixture, the solution is flushed for a short time with oxygen. The mixture is allowed to come to room temperature and is then refluxed for 30 minutes with 200 parts of water. The organic layer is separated and the aqueous layer is extracted several times with ether. The combined organic layer and ether extracts are washed first with 10% sodium hydroxide solution and then with water until the washings are no longer basic. The organic solution is dried over anhydrous calcium sulfate. After removal of the drying agent, the solvents are evaporated. The residue is refluxed for several hours with a mixture of 15 parts of Girard's reagent "P" and 120 parts of a 10% solution of acetic acid in methanol. The reaction mixture is cooled and then poured into a mixture of ice and sufficient 10% sodium hydroxide solution to neutralize 90% of the acetic acid. This mixture is extracted 4 times with ether. The aqueous layer is shaken with 46 parts of concentrated sulfuric acid, a layer of ether is added and the mixture is allowed to stand for 30 minutes. The mixture is shaken at the end of this time and the ether layer is separated. The aqueous layer is extracted 4 times with ether. The ether solutions are combined and washed first with 10% sodium hydroxide solution and then with water until the washings are neutral. The washed ether solution is dried over anhydrous calcium sulfate, filtered, and stripped of solvent. The viscous yellow oil which is obtained as the residue is distilled, using a short path distillation apparatus. The light yellow oil which distills between 156° C. (0.25 mm.) and 200° C. (0.5 mm.) is chromatographed on a column containing 75 parts of alumina. The material is applied to the column in a mixture of 30% (by volume) of benzene and 70% (by volume) of low boiling petroleum ether. The chromatograph is developed with petroleum ether boiling between 30 and 40° C. and a mixture of 30% (by volume) of benzene and 70% of petroleum ether boiling at 30–40° C. The first material which is eluted with a benzene petroleum ether solution is distilled using a short path apparatus to give the pure 4a-methyl-6-methoxy-1,2,3,4,4a,9,10,10a-octahydro-1-phenanthrone boiling at about 134–139° C. and 0.09 mm. pressure. An ethanol solution of this ketone is treated with a solution of the hydrogen sulfate of 2,4-dinitrophenylhydrazine and the resulting mixture is allowed to stand at room temperature. Recrystallized from a mixture of ethanol and ethyl acetate the yellow 2,4-dinitrophenylhydrazone melts at about 95–100° C. The free ketone has an ultraviolet absorption maximum at about 280 mμ with an extinction coefficient of 2400. It has the structural formula

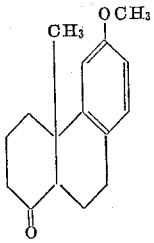

This ketone can be reduced with lithium aluminum hydride in anhydrous ether to yield the 4a-methyl-6-methoxy - 1,2,3,4,4a,9,10,10a - octahydro - 1-phenanthrol which is distilled at about 135–138° C. at 0.1 mm. pressure.

EXAMPLE 2

*4a-methyl-6-ethoxy-1,2,3,4,4a,9,10,10a-octahydro-1-phenanthrone*

A solution of 9.5 parts of dehydrated O-ethylpodocarpinol boiling at about 134–140° C. and 0.1 mm. pressure in a mixture of 32 parts of carbon tetrachloride and 30 parts of chloroform is treated with a stream of ozone and oxygen at −50° C. After treatment with a theoretical amount of ozone the solution is flushed with oxygen, permitted to come to room temperature, diluted with 100 parts of water and heated at reflux temperature for 30 minutes. The organic layer is separated and the aqueous layer is extracted exhaustively with ether. The combined organic solutions are washed with 10% potassium hydroxide solution and then with water to neutrality. The organic solution is then dried over anhydrous magnesium sulfate, filtered and evaporated. The residue is refluxed for 5 hours with a mixture of 8 parts of Girard's reagent "P" and 60 parts of a 10% solution of acetic acid in methanol, after which the reaction mixture is cooled and poured into ice and a sufficient amount of 10% sodium hydroxide solution to neutralize 90% of the acetic acid. The resulting mixture is extracted with ether and then shaken with 23 parts of concentrated sulfuric acid. A layer of ether is added and, after standing for 20 minutes, the mixture is shaken and the ether layer is separated. The aqueous layer is extracted with ether and the combined ether solutions are washed with 10% potassium hydroxide and then with water to neutrality, dried over magnesium sulfate, filtered and evaporated. A viscous yellow oil is obtained which is chromatographed as in the preceding example. Upon distillation using a short path apparatus the 4a-methyl-6-ethoxy-1,2,3,4,4a,9,10,10a-octahydro-1-phenanthrone is obtained as a clear oil distilling at about 135–140° C. at 0.09–0.1 mm. pressure. This ketone has an ultraviolet absorption maximum at about 281 m$\mu$ with an extinction coefficient of 2500. It has the structural formula

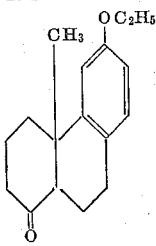

EXAMPLE 3

*4a-methyl-6-benzyloxy-1,2,3,4,4a,9,10,10a-octahydro-1-phenanthrone*

A solution of 10 parts of dehydrated O-benzylpodocarpinol in a mixture of 50 parts of carbon tetrachloride and 50 parts of chloroform is treated with a stream of ozone and oxygen at −60° C. and, after addition of the theoretical amount of ozone, the solution is flushed with oxygen. The reaction mixture is then diluted with 150 parts of water and heated at reflux temperature for 30 minutes after which the organic layer is separated and the aqueous layer is extracted with ether. The organic layers are combined and washed first with 10% sodium hydroxide solution and then with water to neutrality. After drying over magnesium sulfate and removal of the drying agent the solvents are evaporated and the residue is refluxed for 5 hours with a mixture of 10.5 parts of Girard's reagent "P" and 85 parts of a 10% solution of acetic acid in methanol. After cooling the reaction mixture is treated with ice and a sufficient amount of 10% aqueous potassium hydroxide to neutralize most of the acetic acid. It is then extracted with ether and the aqueous layer is shaken with 32 parts of concentrated sulfuric acid. After standing under ether for 30 minutes the mixture is extracted with ether and the combined extracts are washed with 10% aqueous sodium hydroxide and then with water to neutrality. The extracts are dried over magnesium sulfate, filtered and the solvent is distilled. The resulting viscous oil is subjected to chromatography as in Example 1. The 4a-methyl-6-benzyloxy-1,2,3,4,4a,9,10,10a-octahydro-1-phenanthrone is obtained as a clear, slightly yellow, viscous high boiling oil which solidifies on standing to an amorphous solid which has the structural formula shown.

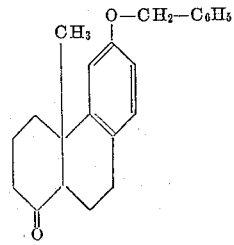

We claim:

1. The ethers of 4a-methyl-6-hydroxy-1,2,3,4,4a,9,10,-10a-octahydro-1-phenanthrone of the structural formula wherein R is a member of the class consisting of lower alkyl and lower aralkyl radicals.

2. The 4a-methyl-6-(lower alkoxy)-1,2,3,4,4a,9,10,-10a-octahydro-1-phenanthrones.

3. 4a-methyl-6-methoxy-1,2,3,4,4a,9,10,10a-octahydro-1-phenanthrone.

4. 4a-methyl-6-ethoxy-1,2,3,4,4a,9,10,10a-octahydro-1-phenanthrone.

5. 4a - methyl - 6 - benzyloxy - 1,2,3,4,4a,9,10,10a-octahydro-1-phenanthrone.

References Cited in the file of this patent

UNITED STATES PATENTS 2,516,153    Schwenk et al. _____ July 25, 1950

FOREIGN PATENTS 976,340    France _____ Dec. 6, 1950

OTHER REFERENCES

Long: "Chem. Reviews" (1940), vol. 27, pp. 477 and 482.

Feiser: "Organic Chemistry" (1944), pp. 67 and 68; Heath & Co., Publishers, Boston.

McElvain: "Characterization of Organic Compounds" (1947), p. 85; MacMullen & Co., Publishers, New York.

Schmidt: "Organic Chemistry," 6th edition (1950), p. 533; Gurney and Jackson, London, Publisher.